US008157715B2

(12) United States Patent
Hamilton et al.

(10) Patent No.: US 8,157,715 B2
(45) Date of Patent: Apr. 17, 2012

(54) FLUID SUPPLY ASSEMBLY FOR A SHAFT MOUNTED DEVICE

(75) Inventors: Sheila Hamilton, Renfrewshire (GB); Charles Jonathan Kennett, Renfrewshire (GB)

(73) Assignee: ITW CS (UK) Limited, London (GB)

( * ) Notice: Subject to any disclaimer, the term of this patent is extended or adjusted under 35 U.S.C. 154(b) by 799 days.

(21) Appl. No.: 12/215,479

(22) Filed: Jun. 27, 2008

(65) Prior Publication Data

US 2009/0001674 A1 Jan. 1, 2009

(30) Foreign Application Priority Data

Jun. 27, 2007 (GB) .................................. 0712476.1

(51) Int. Cl.
*F16C 13/00* (2006.01)

(52) U.S. Cl. .............................. 492/16; 492/46; 492/60

(58) Field of Classification Search .................... 492/15, 492/16, 46, 60
See application file for complete search history.

(56) References Cited

U.S. PATENT DOCUMENTS 3,900,941 A * 8/1975 Browning et al. .............. 29/450
5,114,523 A * 5/1992 Ammon et al. ............... 156/294
6,688,223 B1 * 2/2004 Dauner ......................... 101/217
6,810,800 B1 * 11/2004 Schneider et al. ............ 101/217
6,942,606 B2 * 9/2005 Womer et al. ................... 492/46
2005/0003939 A1 * 1/2005 Womer et al. ................... 492/46

FOREIGN PATENT DOCUMENTS

EP 2008727 A1 * 12/2008
WO WO 03/059535 7/2003
WO WO 2007/012884 2/2007
WO WO 2007/034244 3/2007

* cited by examiner

*Primary Examiner* — Essama Omgba
(74) *Attorney, Agent, or Firm* — Lowe Hauptman Ham & Berner LLP

(57) ABSTRACT

A fluid supply assembly for a shaft mounted device, such as an oscillating roller, is disclosed having a fluid powered apparatus comprising a shaft comprising a first fluid passageway extending through a portion of the shaft and exiting at an exit point on the shaft wall; a connector arranged on the device having a bore for receiving the shaft comprising a first seal spaced apart from a second seal within the bore along an axis parallel to the shaft, the first seal, second seal, the bore and the shaft wall defining a fluid annular chamber, and a second fluid passageway leading from the fluid annular chamber to the fluid powered apparatus wherein, in use, the exit point on the shaft wall remains between the first and second seals. The fluid supply assembly allows quick release application of fluid powered rotating devices.

32 Claims, 1 Drawing Sheet

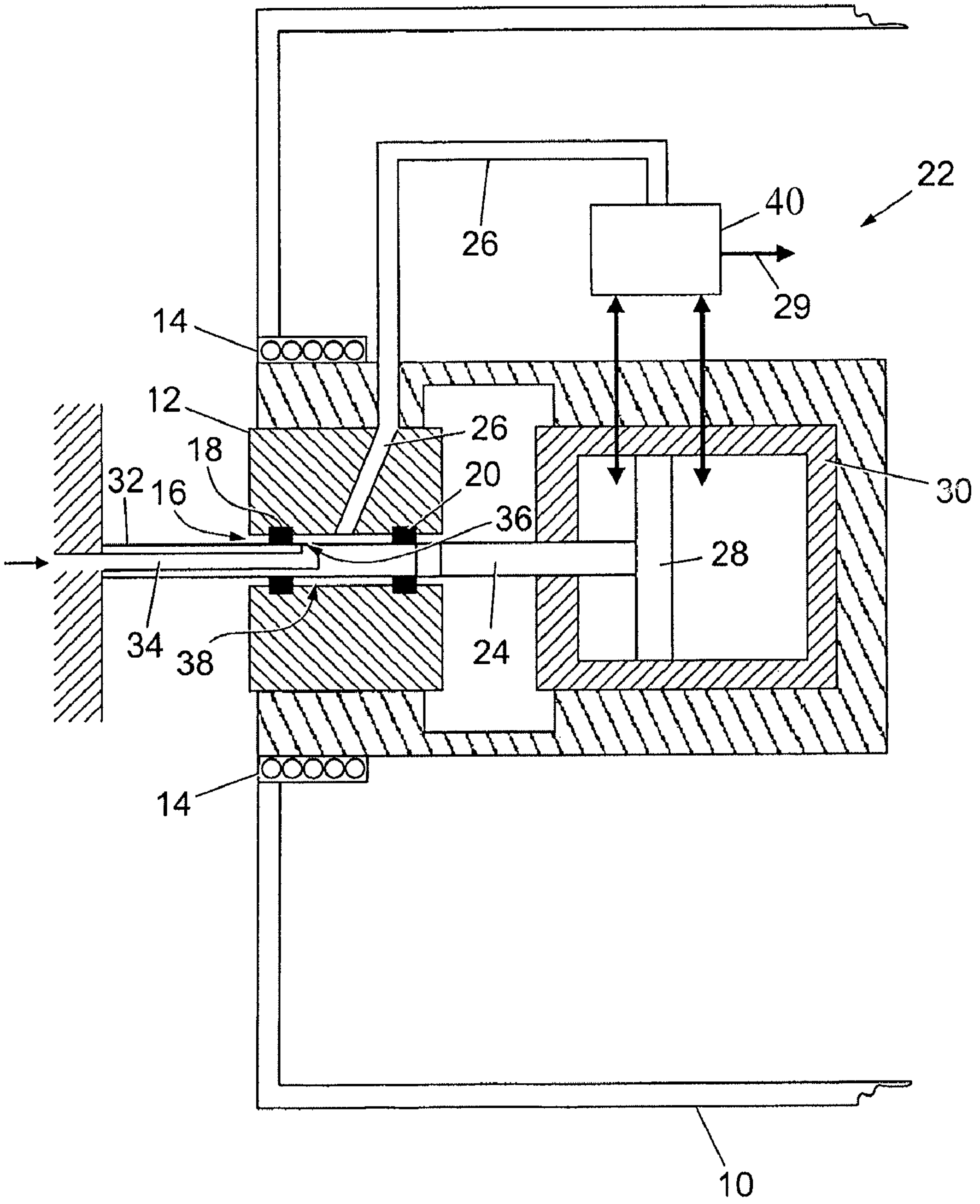
22
40
26
29
14
12
26
18
20
32
16
36
30
28
34
38
24
14
10

FLUID SUPPLY ASSEMBLY FOR A SHAFT MOUNTED DEVICE

FIELD OF THE INVENTION

The present invention relates to a fluid supply assembly for a shaft mounted device and particularly, but not exclusively, to an compressed air supply assembly for an pneumatic actuator assembly for oscillation of an adhesive roller axially with respect to a corresponding cleaning roller in order to prevent the circumferential accumulation of particulate material at a position on the adhesive roller corresponding to a lateral edge of an object being cleaned.

BACKGROUND

Surface cleaning apparatus employing cleaning and adhesive rollers is known. Such apparatus operates by providing a cleaning roller with a surface of relatively low adhesiveness that contacts an adhesive roller of relatively high adhesiveness, the respective rollers being arranged parallel to one another and contacting each other over at least part of their length. As a web or sheet material (hereinafter referred to as a work piece) is conveyed over the surface of the cleaning roller, particulate material is removed. In order that the cleaning roller remains effective over a period of time, the removed particulate material is transferred to, and retained by, the adhesive roller during rotation of the respective rollers. Commonly, the work piece to be cleaned is conveyed through the nip of at least two opposed cleaning rollers which simultaneously remove particulate material from its opposing surfaces.

An important factor in improving production line efficiency is the minimising of downtime. A feature of surface cleaning apparatus of the type described above is that periodic removal of the cleaning and adhesive rollers is necessary. For example, the adhesive rollers need to be refreshed in order to remove saturated exterior adhesive layers and expose underlying fresh areas of adhesive.

A particular problem arises when there is localised heavy saturation of the adhesive roller around its circumference. Such problems are particularly prevalent when cleaning the trimmed edge or edges of a work piece. In doing so, the excess particulate material along the edges of the work piece tends to accumulate in a linear fashion around the circumference of the adhesive roller. The resulting non-uniform distribution of particulate material along the adhesive roller's width reduces its overall cleaning efficiency and necessitates its premature replacement. The accumulation of particulate material arises because: (i) both the cleaning and adhesive rollers extend beyond the lateral edge or edges of the work piece; and (ii) each lateral edge continuously and repetitiously contacts the cleaning roller along the same line of contact which is then transferred to the adhesive roller.

An oscillating adhesive roller is disclosed in WO2007012884. This invention allows the build up of particulate material to be dispersed over a wider area, increasing the life of the adhesive roller significantly and reducing production downtime. The arrangement of WO2007012884 requires that a roller has a cavity within it large enough to act as a reservoir to generate the required build up of pressure for movement of the piston in both directions. As such, it is ineffective with smaller rollers. Furthermore, relatively complex bespoke parts are contained within the roller of WO2007012884 which increases cost.

Standard pneumatic components are small enough to fit within most rollers but, if a roller has to oscillate or rotate, supplying the pneumatic components with a suitable air supply which allows quick and easy removal of the roller has been a problem.

SUMMARY OF THE INVENTION

According to the present invention there is provided a fluid supply assembly for a shaft mounted device having a fluid powered apparatus comprising:

a shaft comprising a first fluid passageway extending through a portion of the shaft and exiting at an exit point on the shaft wall; and a connector arranged on the device having a bore for receiving the shaft comprising a first seal spaced apart from a second seal within the bore along an axis parallel to the shaft, the first seal, second seal, the bore and the shaft wall defining a fluid annular chamber, and a second fluid passageway leading from the fluid annular chamber to the fluid powered apparatus wherein, in use, the exit point on the shaft wall remains between the first and second seals.

Preferably, the fluid supply assembly is for a rotating device.

Alternatively or further preferably, the fluid supply assembly is for an axially oscillating device.

Preferably, the first and second seals are O-rings mounted in suitable channels recessed in the bore.

Preferably, the fluid is a gas.

Preferably, the gas is compressed air.

Preferably, the device is a roller.

Preferably, the roller is an adhesive roller.

Preferably, the fluid powered apparatus is a pneumatic actuator assembly.

Preferably, the pneumatic actuator assembly enables the device to be moved longitudinally with respect to the shaft.

Preferably, the pneumatic actuator assembly oscillates the device axially with respect to the shaft.

Preferably, the pneumatic actuator assembly comprises an actuator.

Preferably, the shaft is a dead shaft.

Alternatively, the shaft is a rotating shaft.

Preferably, the connector has a bearing mounted around it to enable the device to rotate with respect to the connector.

Preferably, the shaft has a plurality of first fluid passageways each having an exit on the shaft wall corresponding to a plurality of connectors.

According to a second aspect of the present invention there is provided an oscillating roller comprising:

a cylindrical roller body;

two supporting shafts;

a connector at each end of the roller body each having a bore for receiving a support shaft; and at least one fluid powered actuator assembly arranged, within the cylindrical roller body, to translate the cylindrical roller body relative, and in parallel to, the two supporting shafts in, at least, a first direction, wherein at least one of the shafts comprises a first fluid passageway extending through a portion of the shaft and exiting at an exit point on the shaft wall and the connector corresponding to the or each shaft comprises a first seal spaced apart from a second seal within the bore along an axis parallel to the shaft, the first and second seals, the bore and the shaft wall defining a fluid annular chamber, and a second fluid passageway leading from the fluid annular chamber to the fluid powered actuator assembly, wherein, in use, the exit point on the shaft wall is positioned between the first and second seals.

Preferably, the at least one fluid powered actuator assembly translates the cylindrical roller body relative, and in parallel to, the two supporting shafts in a second direction opposite to the first.

Alternatively, a resilient device is compressed in response to the translation the cylindrical roller body in a first direction and translates the cylindrical roller body in a second direction, opposite to the first, when force from the at least one fluid powered actuator assembly in the first direction is removed.

Preferably, the first and second seals are O-rings mounted in suitable channels recessed in the bore.

Preferably, the fluid is a gas.

Preferably, the gas is compressed air.

Preferably, the oscillating roller is an adhesive roller.

Preferably, the fluid powered apparatus is a pneumatic actuator assembly.

Preferably, the pneumatic actuator assembly enables the rotating device to be moved longitudinally with respect to the shaft.

Preferably, the pneumatic actuator assembly oscillates the rotating device longitudinally with respect to the shaft.

Preferably, the pneumatic actuator assembly comprises an actuator.

Preferably, the shaft is a dead shaft.

Alternatively, the shaft is a rotating shaft.

Preferably, the connector has a bearing mounted around it to enable the rotating device to rotate with respect to the connector.

Preferably, the shaft has a plurality of first fluid passageways each having an exit on the shaft wall corresponding to a plurality of connectors.

According to a third aspect of the present invention there is provided a contact cleaning apparatus comprising a first roller having a first adhesive surface arranged to be contactable with an object to be cleaned and a second roller according to the second aspect of the present invention, having a second adhesive surface, of greater adhesion than the first adhesive surface.

BRIEF DESCRIPTION OF THE DRAWINGS

Embodiments of the present invention will now be described, by way of example only, with reference to the drawing, in which: FIG. 1 is a cross-sectional side view of [[a]] one end of a roller containing a fluid supply assembly and a fluid powered actuator assembly for moving the roller relative to a shaft which the roller is mounted thereon.

DETAILED DESCRIPTION OF THE PREFERRED EMBODIMENTS

Referring to FIG. 1, a roller 10 is attached to a connector 12 via bearing 14. The connector 12 comprises a bore 16 having a first seal 18 and second seal 20, spaced apart from each other, therein. The connector 12 is attached to a fluid powered actuator assembly 22, which in this case is a pneumatic actuator assembly 22, having an actuator 24 aligned with the bore 16 of the connector 12.

The connector has a first fluid passage which supplies a valve arrangement 40 of the actuator assembly 22. The valve arrangement 40 allows the actuator 24 to be driven in two directions by supplying a working fluid to either side of a piston head 28, which is connected to the actuator 24, and encompassed in a piston cylinder 30. Exhaust valves 29 allow the fluid to escape from one side of the piston head 28 when the fluid is driving the other side of the piston head 28.

In this example, the roller 10 is designed as a quick release roller which is configured to operate in a limited space. As such, the end of the roller 10 that is not shown in FIG. 1 may have a quick release holder, which enables the connector 12 to be easily manoeuvred for sliding on to a shaft 32, which supports the roller 10 at the end shown in FIG. 1. In this case, the shaft 32 does not rotate, which is also known as a dead shaft.

The shaft 32 comprises a second fluid passageway 34 which exits on at an exit point 36 on the side wall of the shaft 32. When the roller 10 is placed on the shaft 32, it is arranged such that the exit point 36 is in between the first and second seals 18, 20.

Pressurised fluid, in this case compressed air, can then be supplied through the second fluid passageway 34 to an annular chamber 38, which is created by the bore 16, shaft 32 and first and second seals 18, 20. The first fluid passageway 26 can then be supplied by compressed air from the annular chamber 38 to power the pneumatic actuator assembly 22.

The pneumatic actuator assembly 22, in this example, acts against the shaft 32 to move the roller 10 back and forward with respect to the shaft 32 in an oscillatory manner.

The distance between the first and second seals 18, 20 is such that the stroke of the actuator 24, which causes the connector 12, and therefore the first and second seals 18, 20, to move up and down the shaft 32, does not take the exit point 36 past either of the first or second seal 18, 20.

This specific example is envisaged to be with an adhesive roller as part of a contact cleaning apparatus. Typically, a contact cleaning apparatus has a cleaning roller with a surface of relatively low adhesiveness, such as rubber, that contacts an adhesive roller with a surface of relatively high adhesiveness, such as glue, the respective rollers being arranged parallel to one another and contacting each other over at least part of their length. As a web or sheet of material, or other object to be cleaned, is conveyed over the surface of the cleaning roller which removes particulate material. In order that the cleaning roller remains effective over a period of time, the removed particulate material is transferred to, and retained by, the adhesive roller during rotation of the respective rollers. Commonly, the web or sheet of material to be cleaned is conveyed through the nip of at least two opposed cleaning rollers which simultaneously remove particulate material from its opposing surfaces.

It will be appreciated that the simultaneous oscillation and rotation of an adhesive roller will prevent localised linear accumulation of adhesive and debris around its circumference. This is because material particulate associated with the lateral edges of the object to be cleaned no longer continuously contact the adhesive roller along the same circumferential line of contact. Instead, the point of contact of material particulate associated with the lateral edges of the object to be cleaned is continually changing during oscillation of the adhesive roller. Advantageously, the effective lifetime of the adhesive roller is prolonged because the material particulate on the surface of the roller is spread over a larger area.

The rate of the axial oscillations may be controlled by controlling the pressure of the fluid, such as compressed air. Furthermore, the cleaning roller may be adapted to oscillate instead of, or in combination with, the adhesive roller.

It should be appreciated that, although the example above has a dead shaft 32 and a roller 10 rotating round the connector 12, the same connector arrangement can be used on a rotating shaft, with the connector either also rotating with the shaft or otherwise. It may be appropriate to have linear bearings to support a roller on a rotating shaft when the roller is also oscillating linearly with respect to the shaft.

For example, an oscillating roller as described in WO2007012884 may have the arrangement, as described therein, for oscillating the roller replaced with an arrangement including a fluid supply assembly, as described herein, and a standard pneumatic piston. The roller as described in WO2007012884 has a roller body about which an inflatable bladder is arranged. An adhesive roll is placed over the roller body and then the inflatable bladder is inflated to secure the adhesive roll to the roller body for rotation. As such, the working fluid for the inflatable bladder can also be supplied by the fluid supply assembly, as herein described. This can either be from the same supply as for the pneumatic piston or through a second air passageway in the shaft 32 and separate connector 12.

The specific example described with respect of FIG. 1 concentrates on the application of the invention to rollers used in cleaning apparatus. It should be appreciated that a fluid supply assembly, as described, has wider application for providing a fluid supply to any oscillating, rotating device or indeed pneumatic device. That is, the fluid supply arrangement may have applications in other situations where a simple fluid coupling is required.

In particular, the fluid supply arrangement is particularly advantageous in quick release applications. The connector 12 can be easily placed over or removed from the shaft 32, as the actuator 24 does not require to be attached to the shaft 32. End stops can be appropriately placed such that the connector 12 is always located correctly on the shaft 32, that is, such that the exit point 36 is between the first and second seals 18, 20. The first and second seals 18, 20 enable the appropriate fluid communication even with movement of the shaft 32 with respect to the connector 12.

Examples of modifications which remain within the scope of the invention include:

the shaft 32 may be a rotating shaft and still be able to supply fluid to the annular chamber 38 and therefore to any fluid powered apparatus connected thereto;

the pneumatic actuator assembly 22 may drive the roller 10 in one direction only, with respect to the shaft 32, against a resilient device, such as a spring, and the resilient device drives the roller 10 back in the opposite direction to generate the oscillations.

the fluid can be liquid, as in a hydraulic system, or any other gas;

the shaft may contain multiple first air passages to multiple connectors, for supplying separately controllable working fluids to different fluid operated devices; and the second fluid passageway 34 in the shaft can convey a fluid into or out of the apparatus, that is, one end of the roller could be a fluid inlet and the other a fluid exit, as might be required in a hydraulic system.

Further modifications and improvements may be made without departing from the scope of the present invention.

The invention claimed is:

1. A fluid supply assembly for a shaft mounted device having a fluid powered apparatus, said assembly comprising:

a shaft comprising a first fluid passageway extending through a portion of the shaft and exiting at an exit point on a wall of the shaft; and a connector arranged on the device and having a bore for receiving the shaft, wherein said connector includes a first seal spaced apart from a second seal within the bore along an axis parallel to the shaft, the first seal, second seal, the bore and the wall of the shaft define a fluid annular chamber, and said shaft further includes a second fluid passageway leading from the fluid annular chamber to the fluid powered apparatus, wherein, in use, the exit point on the wall of the shaft remains between the first and second seals.

2. An assembly as claimed in claim 1, wherein the fluid supply assembly is for a rotating device.

3. An assembly as claimed in claim 1, wherein the fluid supply assembly is for an axially oscillating device.

4. An assembly as claimed in claim 1, wherein the first and second seals are o-rings mounted in suitable channels recessed in the bore.

5. An assembly as claimed in claim 1, wherein a fluid supplied by the fluid supply assembly is a gas.

6. An assembly as claimed in claim 5, wherein the gas is compressed air.

7. An assembly as claimed in claim 1, wherein the device is a roller.

8. An assembly as claimed in claim 7, wherein the roller is an adhesive roller.

9. An assembly as claimed in claim 1, wherein the fluid powered apparatus is a pneumatic actuator assembly.

10. An assembly as claimed in claim 9, wherein the pneumatic actuator assembly enables the device to be moved longitudinally with respect to the shaft.

11. An assembly as claimed in claim 9, wherein the pneumatic actuator assembly oscillates the device axially with respect to the shaft.

12. An assembly as claimed in claim 9, wherein the pneumatic actuator assembly comprises an actuator.

13. An assembly as claimed in claim 1, wherein the shaft is a dead shaft.

14. An assembly as claimed in claim 1, wherein the shaft is a rotating shaft.

15. An assembly as claimed in claim 1, further comprising a bearing mounted around the connector to enable the device to rotate with respect to the connector.

16. An assembly as claimed in claim 1, wherein the shaft has a plurality of first fluid passageways each having an exit on the wall of the shaft corresponding to a plurality of connectors.

17. An oscillating roller comprising:

a cylindrical roller body;

two supporting shafts;

a connector at each end of the roller body, said connector having a bore for receiving one of the supporting shafts; and at least one fluid powered actuator assembly arranged, within the cylindrical roller body, to translate the cylindrical roller body relative, and in parallel to, the two supporting shafts in, at least, a first direction, wherein at least one of the shafts comprises a first fluid passageway extending through a portion of the shaft and exiting at an exit point on a wall of the shaft, wherein the connector corresponding to the shaft comprises a first seal spaced apart from a second seal within the bore along an axis parallel to the shaft, the first and second seals, the bore and the wall of the shaft defining a fluid annular chamber, and a second fluid passageway leading from the fluid annular chamber to the fluid powered actuator assembly, wherein, in use, the exit point on the wall of the shaft is positioned between the first and second seals.

18. A roller as claimed in claim 17, wherein the at least one fluid powered actuator assembly translates the cylindrical roller body relative, and in parallel to, the two supporting shafts in a second direction opposite to the first direction.

19. A roller as claimed in claim 17, wherein a resilient device is compressed in response to the translation of the cylindrical roller body in the first direction and translates the cylindrical roller body in a second direction, opposite to the first direction, when force from the at least one fluid powered actuator assembly in the first direction is removed.

20. A roller as claimed in claim 17, wherein the first and second seals are O-rings mounted in suitable channels recessed in the bore.

21. A roller as claimed in claim 17, wherein the fluid is a gas.

22. A roller as claimed in claim 21, wherein the gas is compressed air.

23. A roller as claimed in claim 17, wherein the oscillating roller is an adhesive roller.

24. A roller as claimed in claim 17, wherein the fluid powered apparatus is a pneumatic actuator assembly.

25. A roller as claimed in claim 24, wherein the pneumatic actuator assembly enables the roller body to be moved longitudinally with respect to at least one of the shafts.

26. A roller as claimed in claim 24, wherein the pneumatic actuator assembly oscillates the roller body longitudinally with respect to at least one of the shafts.

27. A roller as claimed in claim 24, wherein the pneumatic actuator assembly comprises an actuator.

28. A roller as claimed in claim 17, wherein one of the two shafts is a dead shaft.

29. A roller as claimed in claim 28, wherein the other shaft is a rotating shaft.

30. A roller as claimed in claim 17, further comprising a bearing mounted around the connector to enable the roller body to rotate with respect to the connector.

31. A roller as claimed in claim 17, wherein each of the shafts has a plurality of first fluid passageways each having an exit on the wall of the shaft corresponding to a plurality of connectors.

32. A contact cleaning apparatus comprising a first roller having a first adhesive surface arranged to be contactable with an object to be cleaned and a second roller as claimed in claim 17, having a second adhesive surface, of greater adhesion than the first adhesive surface.

* * * * *